(12) United States Patent
Ramamoorthy et al.

(10) Patent No.: US 7,035,694 B2
(45) Date of Patent: Apr. 25, 2006

(54) AUTOMATIC TUNING OF MOTION CONTROLLERS USING SEARCH TECHNIQUES

(75) Inventors: Subramanian Ramamoorthy, Austin, TX (US); Jeanne S. Falcon, Austin, TX (US)

(73) Assignee: National Instruments Corporation, Austin, TX (US)

( * ) Notice: Subject to any disclaimer, the term of this patent is extended or adjusted under 35 U.S.C. 154(b) by 491 days.

(21) Appl. No.: 10/436,839

(22) Filed: May 13, 2003

(65) Prior Publication Data
US 2004/0230325 A1 Nov. 18, 2004

(51) Int. Cl.
*G05B 11/01* (2006.01)

(52) U.S. Cl. .............................. 700/18; 700/63; 700/61; 700/188; 700/181; 700/86; 700/13; 700/169

(58) Field of Classification Search .................. 700/18, 700/63, 61, 188, 28, 159, 169, 13, 86, 181
See application file for complete search history.

(56) References Cited

U.S. PATENT DOCUMENTS

| | | | | |
|---|---|---|---|---|
| 4,135,239 A | * | 1/1979 | Hamill et al. | ................ 700/180 |
| 4,947,336 A | * | 8/1990 | Froyd | ......................... 700/188 |
| 5,025,385 A | * | 6/1991 | Froyd | ......................... 700/169 |
| 5,223,778 A | | 6/1993 | Svarovsky et al. | |
| 5,649,062 A | | 7/1997 | Teng et al. | |
| 5,659,480 A | * | 8/1997 | Anderson et al. | ........... 700/186 |
| 5,684,374 A | | 11/1997 | Chaffee | |
| 5,684,375 A | | 11/1997 | Chaffee et al. | |
| 6,157,864 A | * | 12/2000 | Schwenke et al. | ............. 700/79 |
| 6,161,051 A | * | 12/2000 | Hafemann et al. | ............ 700/86 |
| 6,198,246 B1 | * | 3/2001 | Yutkowitz | .................... 318/561 |
| 6,259,221 B1 | | 7/2001 | Yutkowitz | |
| 6,470,225 B1 | * | 10/2002 | Yutkowitz | ..................... 700/44 |
| 2002/0040250 A1 | | 4/2002 | Gaikwad et al. | |
| 2003/0144751 A1 | * | 7/2003 | Chandhoke et al. | .......... 700/61 |

OTHER PUBLICATIONS

Gaikwad et al., "Auto-Tuning PID Using Loop-Shaping Ideas", Proceedings of the 1999 IEEE, pp. 589-593.
Wang et al., "Optimal Design of PID Process Controllers Based on Genetic Algorithms", Control Eng. Practice, vol. 2, No. 4, pp. 641-648, 1994.

* cited by examiner

*Primary Examiner*—Anthony Knight
*Assistant Examiner*—Thomas Pham
(74) *Attorney, Agent, or Firm*—Meyertons Hood Kivlin Kowert & Goetzel, P.C.; Jeffrey C. Hood; Mark S. Williams

(57) ABSTRACT

System and method for user configuration of an autotuning algorithm for a controller in a motion control system. A desired trajectory in one or more dimensions for the motion control system is received. Values of one or more gains for a controller are initialized. A response trajectory of the controller and motion control system in response to the desired trajectory is received, and an error determined between the response trajectory and the desired trajectory. A gain space is then experimentally searched to determine final values of the one or more gains for the controller that minimize the error (e.g., Euclidean norm) between the response trajectory and the desired trajectory, e.g., via simulated annealing, or other stochastic, quasi-random, and/ or deterministic approaches. After experimentally searching, the controller is operable to control the motion control system substantially in accordance with the desired trajectory using the determined values of the one or more gains.

39 Claims, 12 Drawing Sheets

AUTOMATIC TUNING OF MOTION CONTROLLERS USING SEARCH TECHNIQUES

FIELD OF THE INVENTION

The present invention relates to the automatic tuning of motion controllers, and in particular to a system and method for automatic tuning of single or multiple axis motion controllers with using search techniques.

DESCRIPTION OF THE RELATED ART

The phrase "motion control" refers to controlled displacement of an actuator along trajectories in one or more dimensions. The motions in individual dimensions are generally controlled as independent "axes" with separate control loops that are synchronized at a higher level. Alternatively, in some approaches a multiple input-multiple output (MIMO) control structure is used to control all motion in all the dimensions at once.

Despite the development of more advanced control strategies, the majority of industrial control systems still use PID (Proportional-Integral-Derivative) controllers because they are standard industrial components, and their principles are well understood by engineers. Moreover, due to process uncertainties, a more sophisticated control scheme is not necessarily more efficient than a well-tuned PID controller. However, many controllers are poorly tuned, some too aggressively, and some too sluggishly. When the uncertainty in the disturbance or process dynamic characteristics is large, the tuning of a PID controller (or other types of controllers) is often difficult, and the need for automatic tuning, also referred to as auto-tuning, arises.

Generally, control systems form a control loop, which includes a controller and a process, device, or system to be controlled. For example, a PID controller is included as part of a PID control loop. A process variable (PV) associated with the process is measured and compared to a set point (SP) value. An error value, defined as the difference of the set point and the process value, is supplied as the input to the controller, thus forming a feedback loop. The output of the controller drives the process. Gain values are applied to the error feedback and determine the effective inertia, stiffness, and damping level of the system. A strongly under-damped system will tend to overshoot the target equilibrium value, while a strongly over-damped system will tend to approach the target equilibrium value very slowly.

Often, the control loop for a motion control system includes PID controllers for the various axes, although other control methodologies are also used. However, for most controllers of motion control systems, the control signal is a function of measured or estimated values of the positions and velocities of a motion system. Many motion control system and methods follow a model based approach, i.e., a fixed structure for the model of the dynamics is assumed e.g., a third order transfer function model for the dynamics of the motor controlled by a PID controller. For example, the prior art algorithm described below is implemented in the current automatic tuning feature in National Instruments Corporation's NI-Motion 6.0 motion control product.

The physical or behavior characteristics of different controlled systems may vary greatly, and thus the desired damping characteristics of the respective controllers may vary correspondingly. For example, a large heavy robotic arm has much greater inertia than a small light robotic arm, and so a controller for the large arm may minimize overshooting at the expense of response time, while the controller of the small arm may minimize response time and allow higher overshoot. The propensity of a system to overshoot the equilibrium value is directly related to its "stiffness", i.e., the stiffer a system is, the greater it will tend to overshoot, although response time will generally be lower as well. Conversely, if a system is less stiff, i.e., is more "smooth", then overshoot will be less, but the response time will be greater as well. Thus stiffness and response time are complementary or inversely related aspects of a system. This principle applies not only to mechanical systems, but to any dynamic system, including electronic, electrical, chemical, hydrodynamic, thermodynamic, or any other type of controlled system.

A controlled system's physical or behavior characteristics may be codified in a transfer function or model. Generally, a transfer function describes the characteristic response of a system to standard stimuli. Autotuning methods typically apply a tuning algorithm, such as the Ziegler-Nichols technique, described below, to a system's transfer function to generate or calculate appropriate gain values for the system controller. These gains may then be applied to the PID controller for operational control of the system. By varying parameter values using the autotuning algorithm, gain values may be determined which result in a control system of an appropriate stiffness, response time, and so forth.

General Prior Art Algorithm

The term system or closed-loop system refers to the plant (e.g., motor) connected with the controller (PID) as a feedback loop. The general algorithm is:

1. Excite the system with a predefined input signal (e.g., a step change in control input);
2. Observe the response of the process variable (e.g., position of motor);
3. Determine coefficients of an assumed transfer function model of the system, using data from steps 1 and 2 above; and
4. Using the identified model from step 3, calculate 'optimal' gain settings of the controller (e.g., using Ziegler Nichols rules, described below).

For example, consider a DC motor that can be described by a second order transfer function model, expressed in the s-domain (after taking the Laplace transform of the differential equations of motion), is:

$$\frac{X(s)}{U(s)} = \frac{a_1 s + a_0}{b_2 s^2 + b_1 s + b_0} \qquad (1)$$

where X(s) represents the 'process variables (such as displacement) which are typically observed variables, and U(s) represents control action. $a_i, b_i$ are constants determined by the mechanical design of the motor.

Expressed as an s-domain transfer function, the PID controller equation takes the form:

$$\frac{G(s)}{E(s)} = K_p + \frac{K_i}{s} + K_d s \qquad (2)$$

where G(s) represents a control action that is applied to the motor, and E(s) represents the observed error.

$K_p$, $K_i$, and $K_d$ are the PID gains. The time domain expression for this controller is:

$$u(t) = K_p e(t) + K_i \int_0^t e(\tau)d\tau + K_d \frac{de(t)}{dt} \quad (3)$$

The PID controller in equations (2) and (3) is combined in a feedback loop with the plant, described in equation 1, to form the controlled system. The dynamics of the controlled system is also expressible as a transfer function and its stability is analyzed in terms of a third order characteristic polynomial (the denominator of the closed loop transfer function).

Typically, the system identification process uses a step change in setpoint (and hence the control signal) which corresponds to step 1 above. Step 2 consists of reading the response of the process variable.

FIG. 1 illustrates a step response of a typical second order system, where a control signal gives rise to a response signal of the system. The horizontal trace is the desired setpoint (corresponding to the control signal) and the oscillating trace is the response signal of the un-tuned system. These signals are typically used in a system identification process to identify a closed loop transfer function model. This step (3) uses standard techniques, well known to those skilled in the art. The identified model is then used to determine the ideal controller gain settings.

The design process sometimes uses desired properties such as settling time, overshoot, etc. and determines optimal gain settings based on the identified model and the design specifications. The basic idea is that many dynamic properties of the identified model can be inferred from a characteristic polynomial (the denominator of the transfer function). Given the design specifications, 'ideal' values of the coefficients of this polynomial may be determined. The design process solves for controller parameters that make the characteristic equation of the controlled system take the desired form.

FIG. 2 provides a visual depiction of some of these design parameters, e.g., for a second order system. As FIG. 2 shows, the response trace generally proceeds through a transient stage, where, for example, the trace may oscillate around the desired setpoint or commanded position, approaching the setpoint over a settling time, to a steady-state stage, as shown. The maximum error in the transient stage is referred to as the overshoot, and is further characterized by a rise time and peak time, as FIG. 2 also shows. A steady-state position error indicates variance in the response signal from the control signal after a steady state has been achieved. The settling band indicates a threshold on the commanded position used for calculation purposes. For example, if one wishes the system to reach a position of 1000 counts and a settling band of +/−5 counts is set, then the system is considered to have 'settled' as soon as it is inside the interval (995, 1005). The settling time indicates the time to enter this band. Often, in the presence of static friction and sensor noise, the system may quickly enter the settling band but hunt for the 'correct' position within a 1–2 count interval. For the purposes of tuning a PID loop, the time to enter the band is of interest.

Tuning PID Controllers: Ziegler Nichols Rules

A significant development for PID controller tuning can be dated back to the early work of Ziegler and Nichols (1942). The standard implementation is based on the following procedure:

1. Set the parameters so that the control law in equation 3 is proportional, i.e., $K_i=0$, $K_d=0$;

2. Increase the proportional gain, $K_p$, (starting from 0) slowly until the process starts to oscillate. This state of oscillation may be referred to as a "critical point";

3. If the gain when this occurs is $K_u$ and the period of oscillation is $T_u$, the PID controller parameters are:

$$K_p = K = 0.6 K_u \quad (4)$$

$$K_i = \frac{2K}{T_u}$$

$$K_d = 0.125 K T_u$$

This set of gains will, in most cases, make the system stable. However, this gain set only yields stability of a single axis, and does not provide any guarantees about the achievement of the position trajectory. Good performance on a desired trajectory is only obtained indirectly, given good tuning of an individual motor. It would be desirable to determine methods for directly determining gains that yield the best performance on the desired trajectory.

While the above approach is a commonly used technique for tuning PID controllers, rather recently, many other techniques have been proposed for the autotuning of controllers, e.g., PID controllers, such as relay feedback, pattern recognition techniques, and correlation techniques. A comprehensive survey of autotuning techniques and industrial products is provided in Astrom K. J., T. Hagglund, C. C. Hang and W. H. Ho (1993), Automatic Tuning and Adaptation for PID Controllers—A Survey, *Control Engineering Practice*, Vol. 1, pp. 669–714. The most recent approaches include the non-symmetrical optimum method and the online identification procedure based on the Laguerre series. One common autotuning approach in industry and academic research is relay based autotuning, which switches off the existing controller and uses a relay to excite the process.

Thus, over the years a variety of techniques have been used for tuning controllers, e.g., PID controllers, ranging from variants on the above simple technique to various rather sophisticated methods based on linear quadratic Gaussian (LQG) optimization. All of these methods have substantial drawbacks. For example, all of these techniques assume a standard second order model for system dynamics, possibly including time lag in the process. Additionally, none of these techniques effectively account for many real world nonlinear effects, such as static friction, backlash, etc. While research literature in the field discloses various techniques to address these effects using model-based approaches, some of the advanced techniques require substantial on-board instrumentation and data acquisition capabilities, which can be problematic for embedded systems in that there may not be enough on-board capacity (for storage and/or computation) to implement the algorithms.

The methods described above work well in many situations and have been widely used. However, there are many situations where they fail. The following are examples of systems that perform poorly when tuned using prior art techniques:

Systems with non-linearities: Many physical systems have non-linearities such as friction, backlash, etc. These are typically excluded from the dynamic models and often they are small enough to not affect the design process significantly. However, many motion control systems are high performance applications where these effects do become a problem and the traditional tuning techniques do not suffice.

Systems with time lag and high inertias: In systems that have significant amounts of time lag, the simple third order model does not capture this effect. Again, tuning methods such as those described above need special changes to handle this problem. Typically, the problem is solved by specifically incorporating time delay terms in the model and identifying the parameters appropriately.

Systems with different models: There are many other deviations from the standard model that need to be considered to develop a globally useful model-based tuning technique. Often, problems manifest themselves along with new classes of systems, such as piezoelectric motors or special purpose electrical drives which are used in the motion control system.

Lastly, but possibly most importantly, the above technique ignores many aspects of how a motion control loop is actually implemented. The motion control task of following a specified position trajectory is the result of a trajectory generation process, a control algorithm, and many electrical drive electronic circuits. The trajectory generation process updates the setpoint of the control loop continuously, at a rate that is much faster than the settling time of the physical process. Tuning the control loop for a step response does not guarantee achievement of the position profile.

These issues may be at least partially addressed by implementing a high level adaptation mechanism, where the process is repeated multiple times with heuristics to filter out obvious errors in identification and calculations. However, the heuristics may rely on a number of assumptions that may not be valid for the system, e.g., assumptions related to mass, response times, etc. Additionally, this type of iterated correction may not be feasible depending upon the application and device constraints, e.g., time constraints, memory, processor capabilities, etc. For example, many motion control devices, such as embedded devices, do not permit an analysis intensive program to be run on board.

Additionally, as described above, in model based methods for controller autotuning, the input and output data are typically used to perform 'system identification', a process of estimating the coefficients in a parameterized model whose form is assumed known a priori. This process may be substantially experimental. The controller parameters are then designed using specific properties of the model. This leads to the possibility of mistakes when the real process or system is not properly described by the assumed model.

Therefore improved systems and methods are desired for automatic tuning of motion controllers, including PID motion controllers.

SUMMARY OF THE INVENTION

The present invention comprises various embodiments of a system and method for automatic tuning of a single or multiple axis motion controller using search techniques, for example, where a control loop is used for each axis of motion control, or where a multi-variable approach is used to control the motion in all dimensions at once. As is well known in the art, the control loop includes the controller and a process, device, or system, under control, such as a motor. The input of the control loop is compared to a process variable supplied by the process. The result of the comparison is supplied to the controller, and the controller drives the process. It is noted that the techniques described herein may be applied to many types of motion controllers, including PID controllers and state space motion controllers.

In one embodiment, a desired trajectory for the motion control system may be received. The desired trajectory may be in one or more dimensions, depending upon the number of axes of the motion controller. In other words, the dimensionality of the trajectory corresponds to the number of axes of the motion controller. Thus, in one embodiment, the one or more dimensions may include two or more dimensions, three or more dimensions, four or more dimensions, and so forth. For example, in a motion control system where a multi-segmented arm is controlled, there may be tens or even hundreds of dimensions in the gain space being searched.

Values for one or more gains for a controller may be initialized. In a preferred embodiment, the one or more gains are included in a gain space. For example, if there are N gains, then the gain space is an N-dimensional space that includes all of the gain values to be considered. Thus, initializing the values of the one or more gains may include selecting a point, possibly a random point, in the gain space. In an embodiment where the controller is a PID controller, the one or more gains preferably include: a proportional gain, an integral gain, and a derivative gain (the PID gains) for each respective dimension of the one or more dimensions. Thus, in an embodiment where there the PID motion control system has three axes (and the trajectory is 3-dimensional), there may be nine gain values to initialize (and a nine-dimensional gain space). In embodiments where the controller is implemented differently, e.g., a multivariable controller, then the gains may represent a set of parameters that describe the transformation between measured values and an applied control signal. In this sense, the gain vector contains any relevant numerical values of controller gains. Thus, in multi-dimensional motion control systems, each dimension or axis requires a set of control gains.

Then, a response trajectory of the controller and motion control system may be received in response to the desired trajectory. In other words, the controller and motion control system may operate in accordance with the initialized gain values, and generate the response trajectory, which is then received. Thus, the response trajectory represents or indicates the response of the system to the desired trajectory with the current (initialized) gain values.

An error between the response trajectory and the desired trajectory may be determined. In one embodiment, determining the error between the response trajectory and the desired trajectory includes computing a norm of a difference between the response trajectory and the desired trajectory. For example, the norm may be a Euclidean norm. In a preferred embodiment, the norm is a Euclidean norm of the following form:

$$\|d\|_2 = \left( \sum_{i=0}^{N} (y(i) - x(i))^2 \right)^{\frac{1}{2}},$$

where x includes or represents the desired trajectory, and where y includes or represents the response trajectory. This expression thus represents a summation over all points of the desired and observed trajectories, where N is the total number of points in the trajectory, and i represents a single point. If the trajectories include multiple dimensions (greater than 1), then the above formula is applied for each axis and the error is obtained in vector form. Note that this error metric represents the error between the trajectories in geometric terms, and so may optionally be displayed, e.g., on a display device of a computer system. Of course, other norms quantifying the difference between the response trajectory and the desired trajectory are also contemplated.

For example, the $L_2$ norm is just one way to measure the error. In practice, any error metric may be used to describe the difference between two time series curves, e.g., the generic $L_p$ norm shown below, where p may be any value as desired. Thus, the norm may compute a Euclidean or a non-Euclidean distance.

$$\|d\|_p = \left(\sum_{i=0}^{N} (y(i) - x(i))^p\right)^{\frac{1}{p}}$$

It should be noted that in various embodiments, p may have any value, including 1 (an $L_1$ norm, i.e., the sum of absolute differences), or even infinity (an $L_\infty$ norm). Thus, in one embodiment, the value of p may be greater than 2. In another embodiment, p may be greater than 3, and so forth. It has been shown that fractional norms (p<1) may be better for high dimensional spaces, and so in some embodiment, p may be less than 1. It should be noted that although the $L_\infty$ norm is nominally represented as p=∞. In practice, it is generally not computed as such, but rather, it represents, and is computed as, the maximum deviation between two time series curves. Thus, in embodiments where the "$L_\infty$ norm" is used, the actual value of the metric is determined as the maximum deviation between desired and observed trajectories, viewed as point sets. Again, in the case of multidimensional trajectories, these norms are calculated for each axis, and a resulting vector generated.

Finally, the gain space may be experimentally searched to determine final values of the one or more gains for the controller, where the final values minimize the error between the response trajectory and the desired trajectory. Note that as used herein, the term "experimental search process" refers to the fact that the method does not use a predictive model to determine the final gain values, but instead relies on an iterative experimental search of the gain space, where various sets of gain values are tried, and the resulting response trajectories evaluated, until suitable values are determined. After the search, the controller may be operable to control the motion control system substantially in accordance with the desired trajectory using the determined final values of the one or more gains. A more detailed description of this search process is provided below.

In one embodiment, a current response trajectory for the motion control system using current values of the one or more gains may be evaluated, thereby computing a current error of the current response trajectory with respect to the desired trajectory, e.g., computing a metric, e.g., a norm, such as a Euclidean norm.

New values of the one or more gains may then be determined. There are a number of different ways to determine these new gain values, including deterministic means, stochastic means, pseudo-random means, quasi-random means, hill-climbing techniques, and so forth.

A new response trajectory of the system and controller using the new values of the one or more gains may be evaluated, thereby computing a new error of the new response trajectory with respect to the desired trajectory. A determination may be made as to whether the new error is less than the current error, and if the new error is less than the current error, the current values of the one or more gains may be set to the new values and the current error set to the new error. If the new error is not less than the current error, then in one embodiment, the method may check for a stopping condition, and if there is a stopping condition, the method may terminate. If it is determined that a stopping condition has not occurred, then the method may determine new values for the gains, and the method may continue in an iterative manner as described above until the stopping condition occurs. After the iterative process, the controller is preferably operable to control the motion control system substantially in accordance with the desired trajectory.

As noted above, the experimental search process may be performed in a variety of ways, including, for example, using stochastic means, e.g., performing simulated annealing to search the gain space, using pseudo-random means, quasi-random means, e.g., using a quasi-random sequence such as a Halton sequence, using deterministic means, and using a hill-climbing technique, among others. The following describes one embodiment of an experimental search process that uses simulated annealing.

As is well known in the art, a simulated annealing process generally operates according to a temperature schedule whereby a probability of making a jump (in the gain space) to a less favorable location decreases with temperature (i.e., the algorithm "cools down" while searching for an optimal point).

As described above, first, a current response trajectory for the motion control system using current values of the one or more gains may be evaluated, thereby computing a current error of the current response trajectory with respect to the desired trajectory, e.g., computing a metric, e.g., a norm, such as a Euclidean norm, as described above.

New values of the one or more gains may then be stochastically determined, and a new response trajectory of the system and controller using the new values of the one or more gains may be evaluated, thereby computing a new error of the new response trajectory with respect to the desired trajectory. A determination may be made as to whether the new error is less than the current error, and if the new error is less than the current error, the current values of the one or more gains may be set to the new values, and the current error set to the new error. If the new error is not less than the current error, then in one embodiment, the method may stochastically determine whether to update the current values of the one or more gains (to the new values) and the current error (to the new error), even though the new error is not less than the current error. This is the characteristic "uphill jump" of simulated annealing algorithms, where the probability of making an unfavorable jump decreases with time due to decreasing temperature. If it is stochastically determined to update the gains and error, then the method may update the values, as described above, and continue in an iterative manner, as described above.

If the method determines that the values are not to be updated, then in one embodiment, the method may check for a stopping condition, and, if it is determined that a stopping condition has not occurred, then the method may determine new gain values, and iteratively perform the steps described above until the stopping condition occurs. If there is a stopping condition, then the method may update a temperature for the simulated annealing process in accordance with a temperature schedule, and then determine new gain values, and iteratively perform the steps described above.

Once the temperature has been updated, then the method may determine whether a halting condition occurs, and if it is determined that a halting condition does not occur, then the method may determine new gain values, and iteratively perform the steps described above until a halting condition occurs, where, after iteratively performing, the controller is preferably operable to control the motion control system substantially in accordance with the desired trajectory.

If it is determined that a halting condition does occur, the method may terminate.

It should be noted that there is a difference between the stopping conditions and the halting conditions. Notice that in the above embodiment, the method performs two types of search. The first is a 'local search' process that occurs at a constant temperature (i.e., transition probability to a point that does not improve performance), and is designed to test various points in the space for the desired optimum. This is completed when the 'stopping condition' is reached. The second search process relates to the "annealing" phenomenon, where the probability of a transition to a point of lower performance slowly decreases, with decreasing 'temperature'. This aspect of the process completes when the "halting condition" is reached. Note that this type of search process is particularly useful when there is no analytical model for the process, and so no gradient may be computed for standard gradient descent (or ascent) approaches. Thus, by testing a large number of points and taking the 'best transition', the process of gradient descent is effectively simulated. However, local minima, the famous pitfall in gradient descent methods, must be avoided. This may be achieved by providing a finite small probability of an 'uphill' transition. Now the global step based on a decreasing temperature value is actually reducing the strength or likelihood of this 'uphill' transition by successively lowering the maximum allowable uphill jump, thus encouraging convergence to a specific optimum.

In one embodiment, once the controller and motion control system have been tuned, i.e., once the final values of the one or more gains have been determined, the controller and motion control system may then be operated substantially in accordance with the desired trajectory using the determined final values of the one or more gains.

It is noted that the above embodiments (among others) may themselves be applied in an iterative manner. For example, in one embodiment, the method may also include performing adaptive automatic tuning of the controller and motion control system by iteratively performing the experimentally searching the gain space to determine successive final values of the one or more gains for the controller during operation of the controller and motion control system. In other words, the above-described iterative methods may themselves be performed repeatedly as needed during operation of the system. For example, this approach may be useful when the system's characteristics change during operation, e.g., due to temperature, re-configuration, etc. Alternatively, the desired trajectory may change over the course of operations, in which case, new final values may be computed "on the fly" as needed.

Thus, in various embodiments of the system and method described above, a single or multiple axis motion control system may be automatically tuned using experimental search techniques, e.g., simulated annealing. The search techniques may be based on a metric, e.g., a Euclidean norm, which quantifies the difference between a desired trajectory and a response trajectory of the system. This provides for great flexibility in applying motion control to a variety of different systems as compared to prior art autotuning systems and methods.

BRIEF DESCRIPTION OF THE DRAWINGS

A better understanding of the present invention can be obtained when the following detailed description is considered in conjunction with the following drawings, in which.

Figure 1:
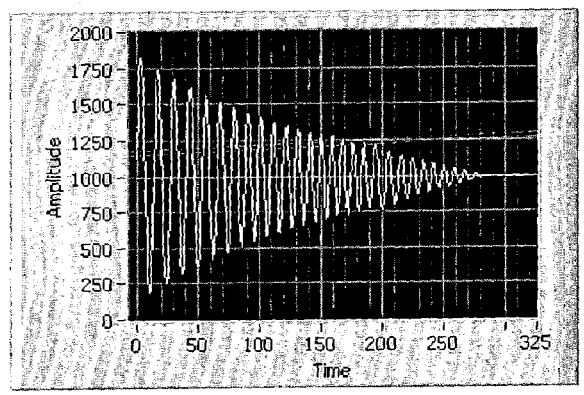
FIG. 1 illustrates a step response of a typical second order system.

While the invention is susceptible to various modifications and alternative forms, specific embodiments are shown by way of example in the drawings and will herein be described in detail. It should be understood however, that drawings and detailed descriptions thereto are not intended to limit the invention to the particular forms disclosed. But on the contrary the invention is to cover all modifications, equivalents and alternatives following within the spirit and scope of the present invention as defined by the appended claims.

DETAILED DESCRIPTION OF THE PREFERRED EMBODIMENT

Incorporation by Reference

U.S. Pat. No. 6,081,751 titled "System and Method for Closed Loop Autotuning of PID Controllers" whose inventors are Rongfu Luo, S. Joe Qin, and Dapang Chen, and which issued on Jun. 27, 2000, is hereby incorporated by reference in its entirety as though fully and completely set forth herein.

Figure 3A:
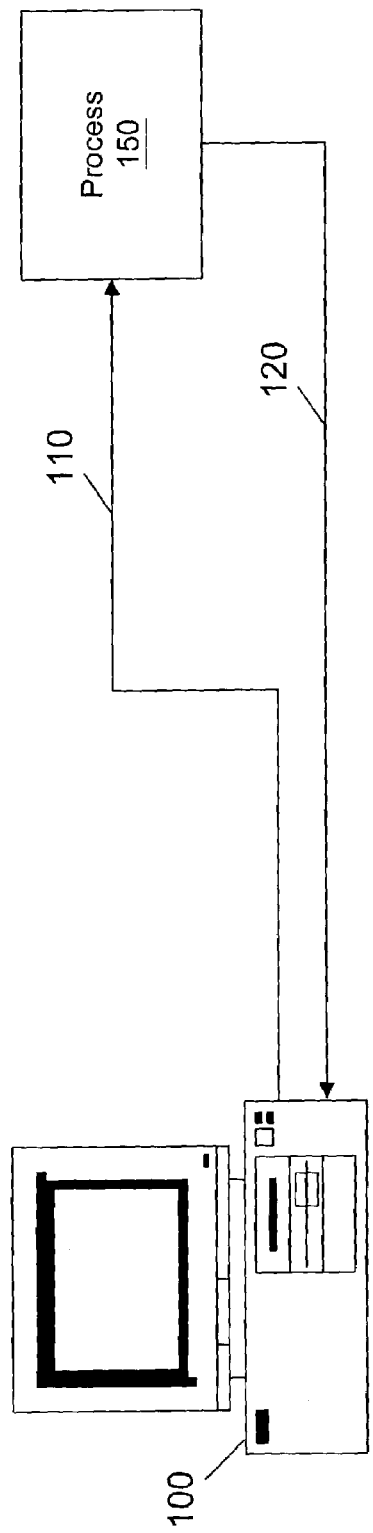
FIG. 3A illustrates a first embodiment of the system of the present invention which includes a computer and a process.
Figure 3B:
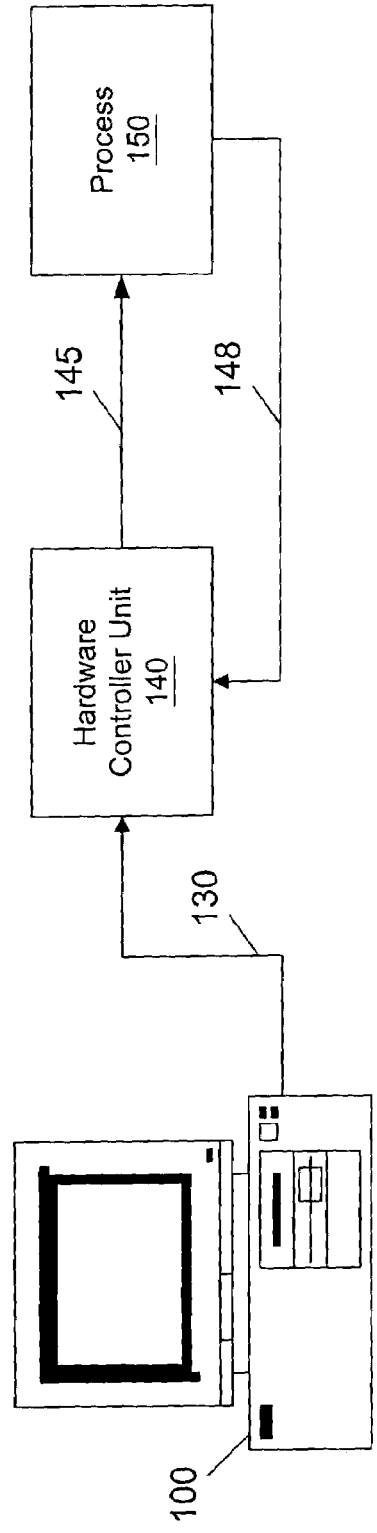
FIG. 3B illustrates a second embodiment of the system of the present invention which includes a computer, a process, and an external hardware controller unit.

FIGS. 3A and 3B: Autotuning Systems

FIG. 3A illustrates a first embodiment of the system of the present invention that includes a computer 100, and process 150. Computer 100 supplies actuating signals to the process 150 through actuating bus 110. It is noted that a D/A conversion device (not shown) is preferably included in this embodiment to convert the actuating signals from a digital form to an analog form. Furthermore, computer 100 senses the process variable PV through measurement bus 120. Data acquisition logic (not shown) such as an A/D conversion device is preferably employed to convert the process variable from analog to digital form. Thus, computer 100 operates on a stream of samples of the process variable (PV).

In one embodiment, the controller may be implemented in software, i.e., a controller program, which may be stored in a memory of the computer 100, and executed by a processor comprised on the computer 100. An autotuning algorithm may also be implemented in software, i.e., in an autotuning program, stored and executed on computer 100. In one embodiment, the autotuning software may include a user interface which allows the user to provide input to the system which may be used to modify or configure the autotuning algorithm. Therefore, the autotuning program may be executable to configure the controller software in accordance with desired characteristics specified by the user. In one embodiment, one or both of the controller and the autotuning algorithm may be implemented in programmable logic, such as a field programmable gate array (FPGA).

In a preferred embodiment, the computer 100 may include a plug-in device, e.g., an internal hardware controller, where a controller program according to the present invention may be stored and executed on the plug-in device. The plug-in device may include programmable logic, an FPGA, and/or memory and processor elements. Thus, in some embodiments, an autotuning algorithm may be implemented in an autotuning program stored and executed on the plug-in device comprised on the computer 100.

FIG. 3B illustrates a second embodiment of the system of the present invention which includes computer 100, process 150, and external hardware controller unit 140, e.g. controller. Thus hardware controller unit 140 may implement the controller, either in software or in programmable logic. Computer 100 is coupled to hardware controller unit 140 through a signal bus 130. Hardware controller unit 140 drives process 150 with actuating signal u through process bus 145. Also, hardware controller unit 140 senses process variable PV through sensing bus 148. Hardware controller 140 preferably includes an A/D conversion device to convert the process variable received via sensing bus 148 from analog to digital form.

In this second embodiment of the present invention, the computer 100 sends a setpoint signal SP, which is the target equilibrium value of the process variable PV to the hardware controller unit 140 through signal bus 130. The hardware controller unit 140 performs at least a portion of the autotuning operations. In other words, in this embodiment, the autotuning operations may be performed entirely by the hardware controller unit 140, or by both hardware controller unit 140 and software comprised on the computer 100. Further details of the autotuning process are described below with reference to FIGS. 6A–6C.

Memory Medium

As mentioned above, in various embodiments, part or all of the autotuning algorithm may be stored on computer 100, i.e., in a memory medium, such as the memory medium comprised on computer 100, or, in an alternate embodiment, stored in a memory medium comprised on the hardware controller unit 140 shown in FIG. 3B. The term "memory medium" is intended to include various types of memory or storage, including an installation medium, e.g., a CD-ROM, or floppy disks, a random access memory or computer system memory such as DRAM, SRAM, EDO RAM, Rambus RAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer, such as computer 100, in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium.

Also, the computer system 100 described above may take various forms, including a personal computer system, mainframe computer system, workstation, network appliance, Internet appliance, personal digital assistant (PDA), or other device. In general, the term "computer system" can be broadly defined to encompass any device having a processor which executes instructions from a memory medium.

The memory medium in one or more of the above systems thus may store a software program and/or data for autotuning the controller using any of various stochastic search techniques, as described in detail below. A CPU or processing unit in one or more of the above systems executing code and data from a memory medium comprises a means for executing the autotuning software program according to the methods or flowcharts described below with reference to FIGS. 6A–6C.

Various embodiments further include receiving or storing instructions and/or data implemented in accordance with the present description upon a carrier medium. Suitable carrier media include memory media as described above, as well as signals such as electrical, electromagnetic, or other forms of analog or digital signals, conveyed via a communication medium such as networks and/or a wireless link.

Figure 4:
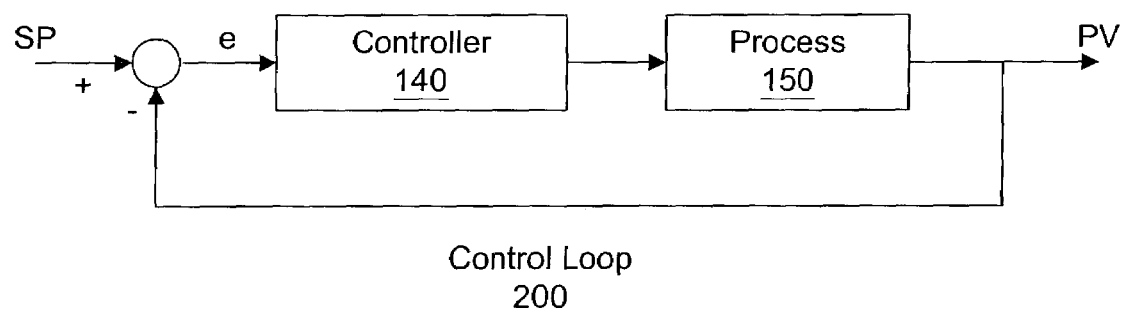
FIG. 4 illustrates a control loop, according to one embodiment.

FIG. 4—Control Loop

FIG. 4 illustrates the structure of a control loop, according to one embodiment. As FIG. 4 shows, control loop 200 includes controller 140 and process 150, which is to be controlled. For example, the controller may be a PID controller, or any other type of controller. In this example, a process variable PV associated with the process 150 is measured and compared to a set point value SP, which is the target equilibrium value of the process variable PV. An error value e, defined as the difference of the set point and the measured process value, is supplied as the input to the controller 140, thus forming a feedback loop. The output of the controller 140 drives the process 150. Gain values are applied to the error feedback and determine the damping level of the system. A strongly under-damped system will tend to overshoot the target equilibrium value, while a strongly over-damped system will tend to approach the target equilibrium value very slowly.

Autotuning Without Models

The primary difference between model based methods and model free methods is that in model based methods, the input and output data are used to perform 'system identification'—a process of estimating the coefficients in a parameterized model, whose form is assumed known a priori. This process is generally substantially experimental. The controller parameters are then designed using specific properties of the model, leading to the possibility of mistakes when the real plant (e.g., motor) is not properly described by the assumed model. In model free methods, described herein, the design is performed with little or no knowledge of the internal structure of the plant (e.g., motor). In this "model free" approach, such mistakes may be avoided because there are no modeling assumptions.

The goal is to design an automatic tuning procedure that can generate gains for motion control loops, e.g., PID or state space motion control loops. One desired feature is that the algorithm needs to function with a variety of different motors and motion stages, ranging from light, highly resonant stages to ones with large inertias. In addition, some users tend to use stages with static friction and backlash in gears, etc. It is desired that the tuning program work under all these circumstances.

As used herein the term "controller" refers to any algorithm that produces a control signal as a function of measured or estimated variables, e.g., position, velocity, and acceleration of the axes in motion.

Generalizing equation (3) gives:

$$u(t)=f(e(t))$$

$$e(t)=y(t)-x(t) \quad (5)$$

The variables y(t), x(t) and u(t), may be in one or more dimensions, where y(t) represents the observed variable and x(t) represents the desired value of that variable. The one or more gains thus comprise a corresponding one or more coefficients or parameters of $f(e(t))$. Note that in embodiments where y(t), x(t), and $f(e(t))$ are multivariable functions, the one or more gains comprise coefficients or parameters for each respective dimension of the one or more dimensions.

Also, the above formulas may represent a continuous time formulation, in that the arguments apply, without alteration, to processes represented in discrete time, e.g., parameterized by a sample i in place of time t. Therefore, one may have a multivariable controller where the function $f$ (i.e., the control law) is parameterized in terms of a number of parameters (i.e., the gains). Described herein are various embodiments of a tuning procedure that can operate in this multivariable setting and produce an optimal set of gains to achieve minimum error with respect to a desired trajectory.

The basic principle is that the behavior of a controlled servo system can be captured by the time domain response of the process variable. This behavior may be quantified by an error metric based on the differences between the desired setpoint and the observed response, i.e., between a desired trajectory and a response trajectory. In one embodiment, the error metric may be expressed as a norm, e.g., a Euclidean norm or other type of norm. For example, in a preferred embodiment, the norm may be an $L_2$ norm, as expressed by equation (5):

$$\|d\|_2 = \left(\sum_{i=0}^{N} (y(i)-x(i))^2\right)^{\frac{1}{2}} \quad (6)$$

Classical tuning techniques have used many specifications ranging from rise time, settling time, etc. to frequency domain specifications such as closed loop gains at various frequencies. However, the $L_2$ norm, $\|d\|_2$, captures the essence of all of these in a compact way and provides us with a quick way to evaluate system behavior. Moreover, as already mentioned earlier, the $L_2$ norm, $\|d\|_2$, can describe the combined effect of all elements in the motion controller (i.e., trajectory generator, control algorithm and drive electronics) as opposed to a "naïve" step response test that really only describes a subset of the behavior under consideration.

The $L_2$ norm is just one way to measure the error. In practice, one is free to use any error metric to describe the difference between two time series curves, e.g., the generic $L_p$ norm of equation (7), where p may be any value as desired. Thus, the norm may compute a Euclidean or a non-Euclidean distance.

$$\|d\|_p = \left(\sum_{i=0}^{N} (y(i)-x(i))^p\right)^{\frac{1}{p}} \quad (7)$$

It should be noted that in various embodiments, p may have any value, including 1 (an $L_1$ norm, i.e., the sum of absolute differences), or even infinity. Thus, in one embodiment, the value of p may be greater than 2. In another embodiment, p may be greater than 3, and so forth. It has been shown that fractional norms (p<1) may be better for high dimensional spaces, and so in some embodiment, p may be less than 1. It should be noted that although the $L_\infty$ norm is nominally represented as p=∞ infinity, in practice, it is generally not computed as such, but rather it really represents, and is computed as, the maximum deviation between two time series curves. Thus, in embodiments where the "$L_\infty$ norm" is used, the actual value of the metric is determined as the maximum deviation between desired and observed trajectories, viewed as point sets. In the case of multidimensional trajectories, these deviations will be expressed in vector form.

An additional advantage of using a performance measure based on trajectory data is the fact that the norm applies, as is, to a wide variety of trajectory geometries. So, if a version of a tuning program that optimizes system performance on specific user defined trajectories (or even circular arcs) is desired, then this norm provides a measurement of how faithfully that specification has been met.

Figure 5:
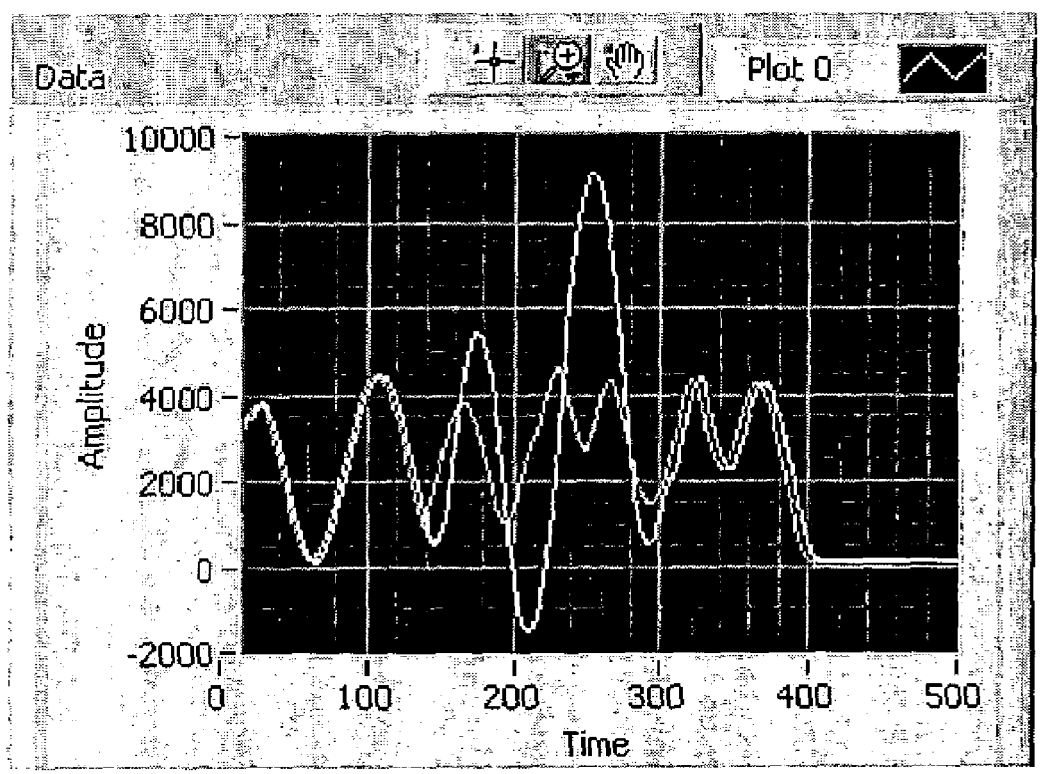
FIG. 5 illustrates an example response of a motor to a user defined trajectory.

FIG. 5 illustrates an example of a system response to an arbitrary user defined trajectory and an assumed set of gains. This type of trajectory presents a situation where the prior art approach to tuning described earlier is inadequate. However, due to the fact that the metric introduced in equation (6) is based on the response trajectory, rather than on specific control (e.g., model) parameters of the system as with most prior art methods, the methods described herein may avoid many of the limitations in performance and effectiveness of the prior art. Thus, the norm applies (without any change) to this type of arbitrary trajectory, as well as simple step responses.

Given the metric of equation (7), or some similar trajectory-based error, the general concept of the present invention is to search the design parameter space by experimenting with various control gain sets and observing the time domain response trajectory, e.g., by evaluating the metric. The best control gains are selected from these experimental data points. It should be noted that a naïve approach where the entire design space (the gain space) is exhaustively searched would take prohibitively long and so is not feasible. Thus, more efficient search techniques may be used to determine substantially optimal gain values for the controller, some examples of which are described below.

Figure 6A:
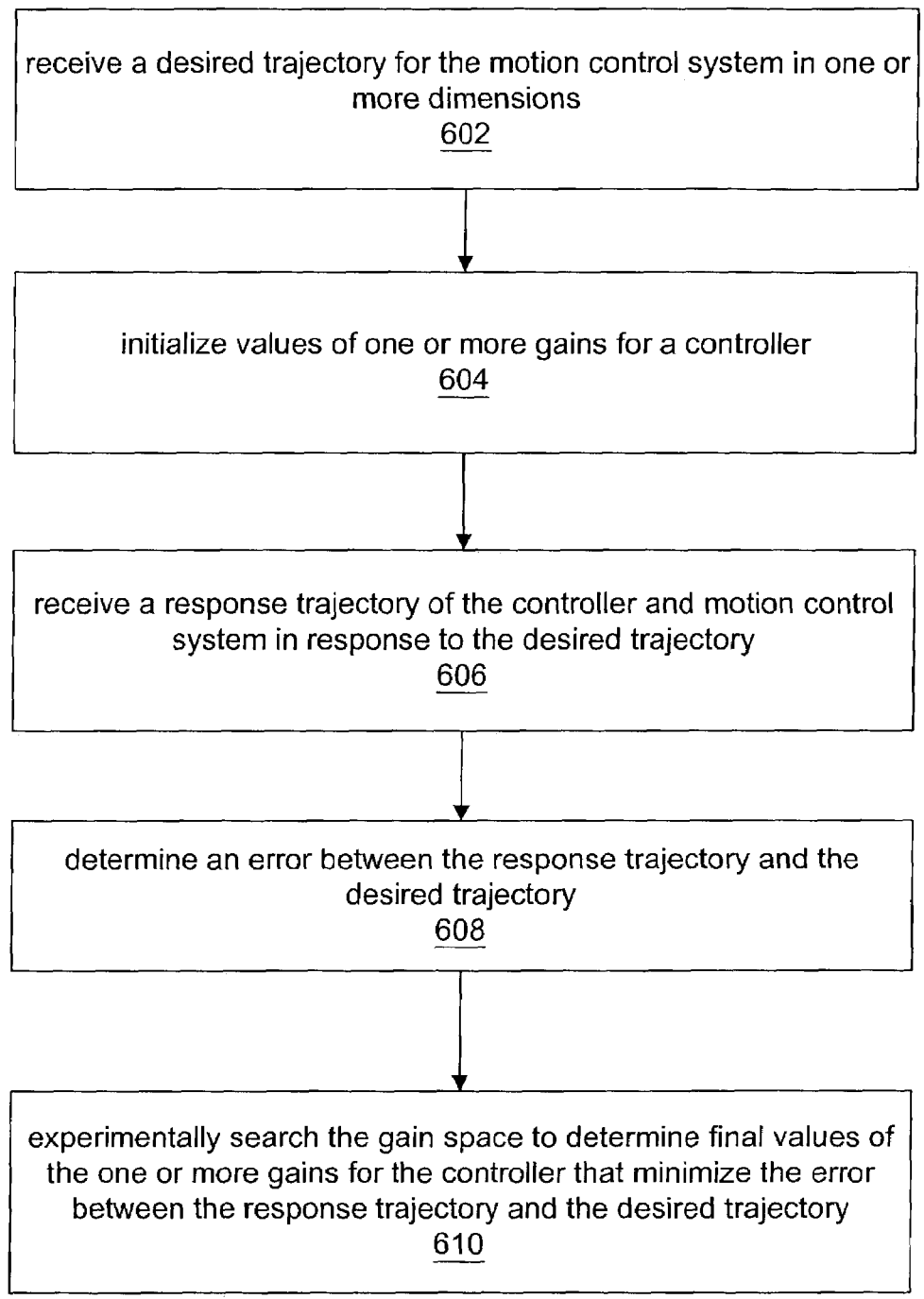
FIG. 6A is a high level flowchart of an autotuning process, according to one embodiment of the present invention.
Figure 6B:
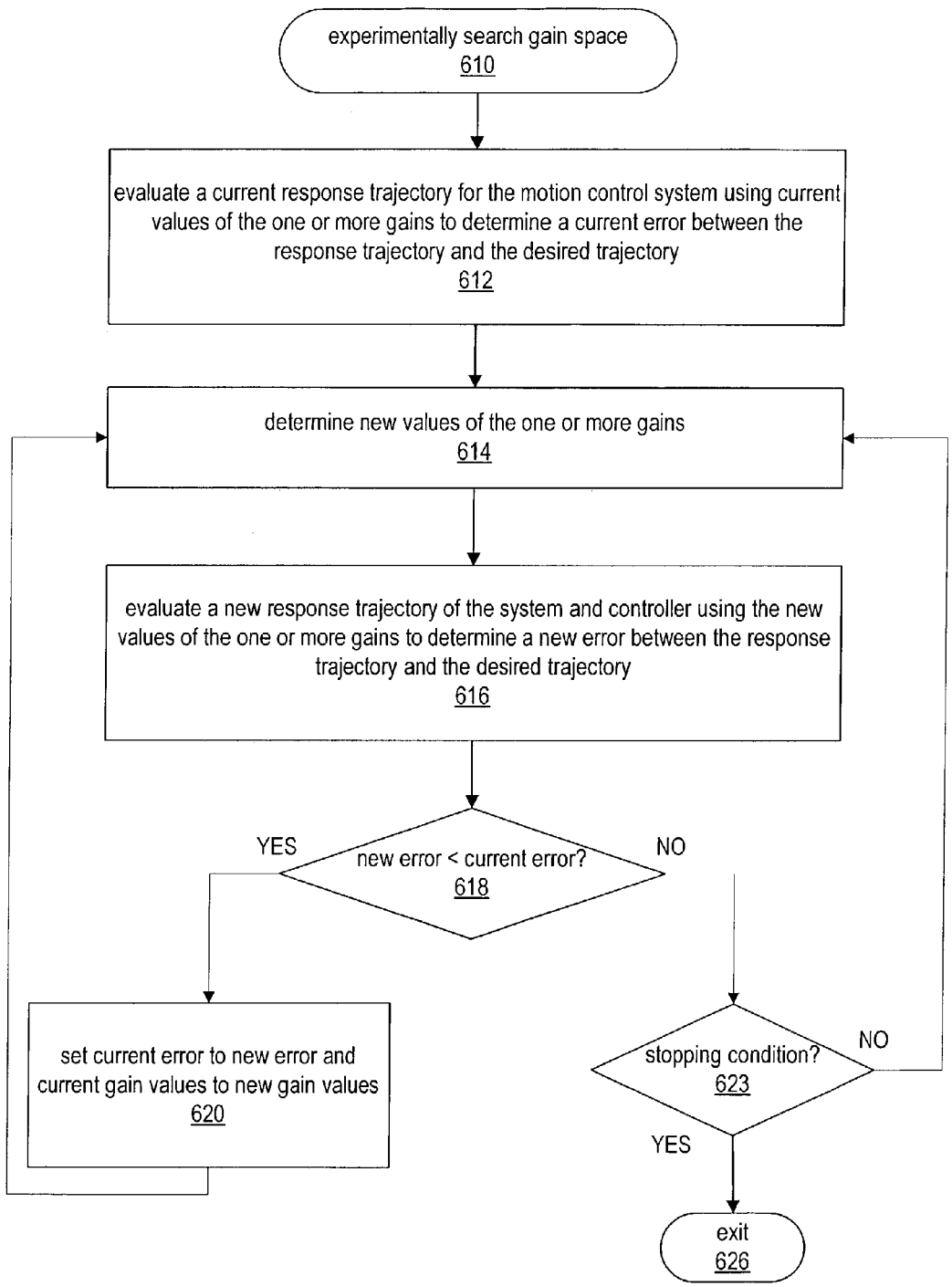
FIG. 6B is a detailed flowchart of an experimental search of the gain space of the method of FIG. 6A.
Figure 6C:
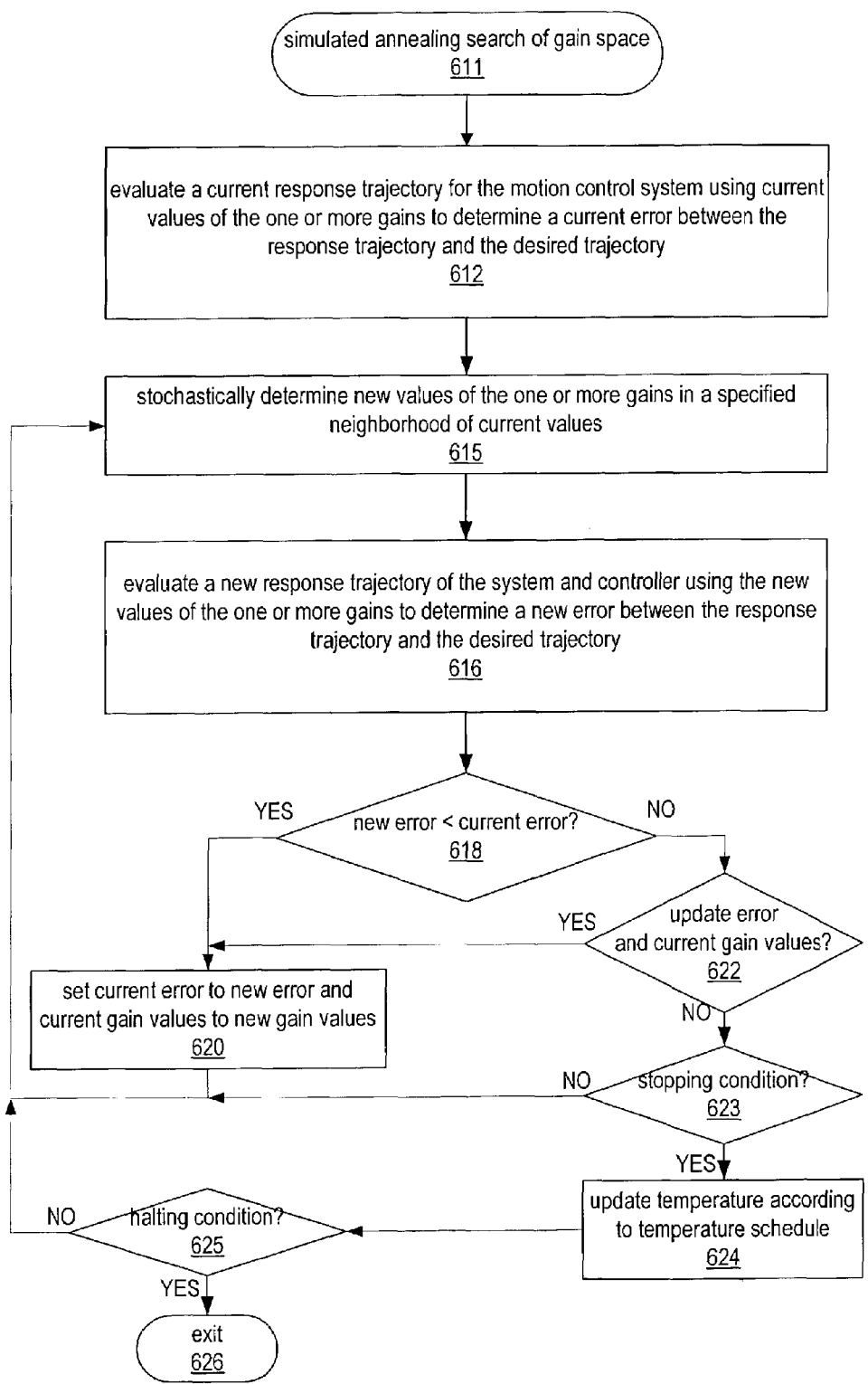
FIG. 6C is a detailed flowchart of an experimental search of the gain space of the method of FIG. 6A using simulated annealing.

FIGS. 6A–6C—Flowchart Diagrams of an Autotuning Process

FIGS. 6A–6C flowchart various embodiments of a method for automatically tuning a single or multiple axis motion control system. More specifically, FIG. 6A is a high-level flowchart of an autotuning process, according to one embodiment. FIG. 6B is a more detailed flowchart of a searching process performed in the method of FIG. 6A, and FIG. 6C flowcharts an embodiment of the methods of FIGS. 6A and 6B using a simulated annealing search technique. It should be noted that in various embodiments of the methods described below, some of the following process elements may occur in tandem, in a different order than is shown, or may be omitted. Additional steps may also be performed as desired.

FIG. 6A—Flowchart Diagram of an Autotuning Process

FIG. 6A is a high-level flowchart of a computer based autotuning process for a single or multiple axis motion controller system, according to one embodiment of the present invention.

As FIG. 6A shows, in 602 a desired trajectory for the motion control system may be received. The desired trajectory may be in one or more dimensions, depending upon the number of axes of the motion controller. In other words, the dimensionality of the trajectory corresponds to the number of axes of the motion controller. Thus, in one embodiment, the one or more dimensions may include two or more dimensions. In another embodiment, the one or more dimensions may include three or more dimensions. In yet another embodiment, the one or more dimensions may include four or more dimensions. For example, in a motion control system where a multi-segmented arm is controlled, there may be tens or even hundreds of dimensions in the gain space being searched.

In 604, values for one or more gains for a controller may be initialized. In a preferred embodiment, the one or more gains are included in a gain space, and represented by a gain vector. For example, if there are N gains, then the gain space is an N-dimensional space that includes all of the gain values to be considered. Thus, initializing the values of the one or more gains may include selecting a point, possibly a random point, in the gain space. In an embodiment where the controller is a PID controller, the one or more gains include: a proportional gain, an integral gain, and a derivative gain (the PID gains) for each respective dimension of the one or more dimensions. Thus, in an embodiment where there the PID motion control system has three axes (and the trajectory is 3-dimensional), there may be nine gain values to initialize (and a nine-dimensional gain space). In embodiments where the controller is implemented differently, e.g., a multivariable controller, then the gains may represent a set of parameters that describe the transformation between measured values and an applied control signal. In this sense, the gain vector contains any relevant numerical values of controller gains. Thus, in multi-dimensional motion control systems, each dimension or axis requires a set of control gains.

Then, in 606, a response trajectory of the controller and motion control system may be received in response to the desired trajectory. In other words, the controller and motion control system may operate in accordance with the initialized gain values, and generate the response trajectory, which is then received. Thus, the response trajectory represents or indicates the response of the system to the desired trajectory with the current (initialized) gain values.

In 608, an error between the response trajectory and the desired trajectory may be determined. In one embodiment, determining the error between the response trajectory and the desired trajectory includes computing a norm of a difference between the response trajectory and the desired trajectory. For example, the norm may be a Euclidean norm.

In a preferred embodiment, the norm is a Euclidean norm of the following form (from equation 6):

$$\|d\|_2 = \left(\sum_{i=0}^{N} (y(i) - x(i))^2\right)^{\frac{1}{2}},$$

where x includes or represents the desired trajectory, and where y includes or represents the response trajectory. Note that this error metric represents the error between the trajectories in geometric terms, and so may optionally be displayed, e.g., on a display device of a computer system. As noted above, this particular expression for the norm is but one example of a suitable norm, and that other norms are also contemplated, including, for example, $L_1, L_2, L_3$ norms, or higher, including $L_\infty$, e.g., norms based on maximal deviations between desired and observed trajectories, as well as fractional norms. When the trajectories are in multiple dimensions, then the result of these norms is computed for each axis to yield a vector. A related approach is to express the difference between trajectory points in multiple dimensions as a matrix and to compute a matrix norm which may be used like the vector norm for a single dimension.

Finally, in 610, the gain space may be experimentally searched to determine final values of the one or more gains for the controller, where the final values minimize the error between the response trajectory and the desired trajectory. Note that as used herein, the term "experimental search process" refers to the fact that the method does not use a predictive model to determine the final gain values, but instead relies on an iterative experimental search of the gain space, where various sets of gain values are tried, and the resulting response trajectories evaluated, until suitable values are determined. After the search, the controller may be operable to control the motion control system substantially in accordance with the desired trajectory using the determined final values of the one or more gains. A more detailed description of this search process is provided below with reference to FIG. 6B.

It should be noted that the search process performs the function of optimization. In other words, the method selects the best set of controller gains as those gains that yield the lowest error, i.e., lowest values of the norms, e.g., $L_2, L_p, L_\infty$, etc., vector norms, or even a matrix norm. In the language of optimization theory, these norms represent an objective function to be optimized.

FIG. 6B—Flowchart Diagram of a Gain Space Search Process

FIG. 6B flowcharts one embodiment of the experimental search process of step 610 in the method of FIG. 6A.

As FIG. 6B shows, in 612, a current response trajectory for the motion control system using current values of the one or more gains may be evaluated, thereby computing a current error of the current response trajectory with respect to the desired trajectory, e.g., computing a metric in accordance with equation (6) or equation (7), above.

In 614, new values of the one or more gains may be determined. There are a number of different ways to determine these new gain values, including deterministic means, stochastic means, pseudo-random means, quasi-random means, hill-climbing techniques, and so forth. A more detailed description of an approach using simulated-annealing is provided below with reference to FIG. 6C.

A new response trajectory of the system and controller using the new values of the one or more gains may be evaluated, thereby computing a new error of the new response trajectory with respect to the desired trajectory, as indicated in 616.

In 618, a determination may be made as to whether the new error is less than the current error, and if the new error is less than the current error, the current values of the one or more gains may be set to the new values, and the current error set to the new error, as indicated in 620.

If in 618, the new error is not less than the current error, then in one embodiment, the method may check for a stopping condition, as indicated in 623. If there is a stopping condition, then the method may terminate, as 626 indicates.

If in 623, it is determined that a stopping condition has not occurred, then the method may return to step 614 as shown, and iteratively perform the steps described above until the stopping condition occurs. After the iteratively performing, the controller is preferably operable to control the motion control system.

As noted above, the experimental search process may be performed in a variety of ways, including, for example, using stochastic means, e.g., performing simulated annealing to search the gain space, using pseudo-random means, quasi-random means, e.g., using a quasi-random sequence such as a Halton sequence, using deterministic means, and using a hill-climbing technique, among others.

FIG. 6C, described below, flowcharts one embodiment of an experimental search process that uses simulated annealing.

FIG. 6C—Search Process Using Simulated Annealing

FIG. 6C flowcharts one embodiment of a search process that uses simulated annealing (also known as stochastic relaxation or probabilistic exchange algorithm). As is well known in the art, a simulated annealing process generally operates according to a temperature schedule whereby a probability of making a jump (in the gain space) to a less favorable location decreases with temperature (i.e., the algorithm "cools down" while searching for an optimal point). Note that where the steps are substantially the same as in the method of FIG. 6B, the descriptions may be abbreviated.

In 612, a current response trajectory for the motion control system using current values of the one or more gains may be evaluated, thereby computing a current error of the current response trajectory with respect to the desired trajectory, e.g., computing a metric in accordance with equation (5), above.

In 615, new values of the one or more gains may be stochastically determined.

A new response trajectory of the system and controller using the new values of the one or more gains may be evaluated, thereby computing a new error of the new response trajectory with respect to the desired trajectory, as indicated in 616.

In 618, a determination may be made as to whether the new error is less than the current error, and if the new error is less than the current error, the current values of the one or more gains may be set to the new values, and the current error set to the new error, as indicated in 620. In the case of multidimensional trajectories, the term "error is less than current error" means that the magnitude of the vector new error is less than the magnitude of the vector current error.

If in 618, the new error is not less than the current error, then in one embodiment, the method may stochastically determine whether to update the current values of the one or more gains (to the new values) and the current error (to the new error), even though the new error is not less than the current error. This is the characteristic "uphill jump" of simulated annealing algorithms, where the probability of making an unfavorable jump decreases with time due to decreasing temperature. For example, in one embodiment, the determination of 622 may be made in accordance with:

$$random [0, 1) < e^{\frac{eval(v_c)-eval(v_n)}{T}}, \quad (8)$$

where T is the temperature, and the evaluations refer to the metric d (e.g., from equation (5)) for the current and new gains, represented by gain vectors $v_c$ and $v_n$, respectively. If it is stochastically determined to update the gains and error, then the method may proceed to 620 and update the values, as described above.

If the method determines (in 622) that the values are not to be updated, then in one embodiment, the method may check for a stopping condition, as indicated in 623, and, if in 623, it is determined that a stopping condition has not occurred, then the method may return to step 615 as shown, and iteratively perform the steps described above until the stopping condition occurs.

If there is a stopping condition, then the method may proceed to 624, where a temperature for the simulated annealing process may be updated in accordance with a temperature schedule, and then proceed with 615, as described above. For example, in one embodiment, the temperature may be updated in accordance with a temperature schedule function:

$$T \leftarrow g(T,t), \quad (9)$$

where T is temperature (or an equivalent parameter), and t is time (or iteration). For example, in one embodiment, the temperature schedule function may be:

$$g(T, t) = Ce^{-\frac{t}{\tau}}, \quad (10)$$

where t is time (or iteration), and where C and τ (>0) are user defined constant parameters. For example, in one embodiment, C sets the scale of the curve, and τ shapes the curve.

Once the temperature has been updated, then in 625, the method may determine whether a halting condition occurs, and if it is determined that a halting condition does not occur, then the method may proceed with 615, as described above. In other words, the method may iteratively perform 615 through 624 as described above until a halting condition occurs, where, after iteratively performing, the controller is preferably operable to control the motion control system substantially in accordance with the desired trajectory.

If in 625, it is determined that a halting condition does occur, the method may terminate, as indicated in 626.

It should be noted that there is a difference between the stopping conditions and the halting conditions. Notice that in the above embodiment, the method performs two types of search. The first is a 'local search' process that occurs at a constant temperature (i.e., transition probability to a point that does not improve performance), and is designed to test various points in the space for the desired optimum. This is completed when the 'stopping condition' is reached. The second search process relates to the "annealing" phenomenon, where the probability of a transition to a point of lower performance slowly decreases, with decreasing 'temperature'. This aspect of the process completes when the "halting condition" is reached. Note that this type of search process is particularly useful when there is no analytical model for the process, and so no gradient may be computed for standard gradient descent (or ascent) approaches. Thus, by testing a large number of points and taking the 'best transition', the process of gradient descent is effectively simulated. However, local minima, the famous pitfall in gradient descent methods, must be avoided. This may be achieved by providing a finite small probability of an 'uphill' transition. Now the global step based on a decreasing temperature value is actually reducing the strength or likelihood of this 'uphill' transition by successively lowering the maximum allowable uphill jump, thus encouraging convergence to a specific optimum.

In one embodiment, once the controller and motion control system have been tuned, i.e., once the final values of the one or more gains have been determined, the controller and motion control system may then be operated substantially in accordance with the desired trajectory using the determined final values of the one or more gains.

It is noted that the above embodiments (among others) may themselves be applied in an iterative manner. For example, in one embodiment, the method may also include performing adaptive automatic tuning of the controller and motion control system by iteratively performing the experimentally searching the gain space to determine successive final values of the one or more gains for the controller during operation of the controller and motion control system. In other words, the above-described iterative methods may themselves be performed repeatedly as needed during operation of the system. For example, this approach may be useful when the system's characteristics change during operation, e.g., due to temperature, re-configuration, etc. Alternatively, the desired trajectory may change over the course of operations, in which case, new final values may be computed "on the fly" as needed.

Figure 7:
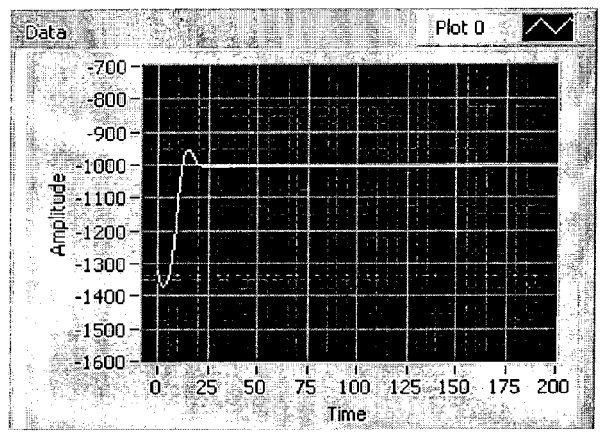
FIG. 7 illustrates a response of a motor to a step response for "good" gains values.
Figure 8:
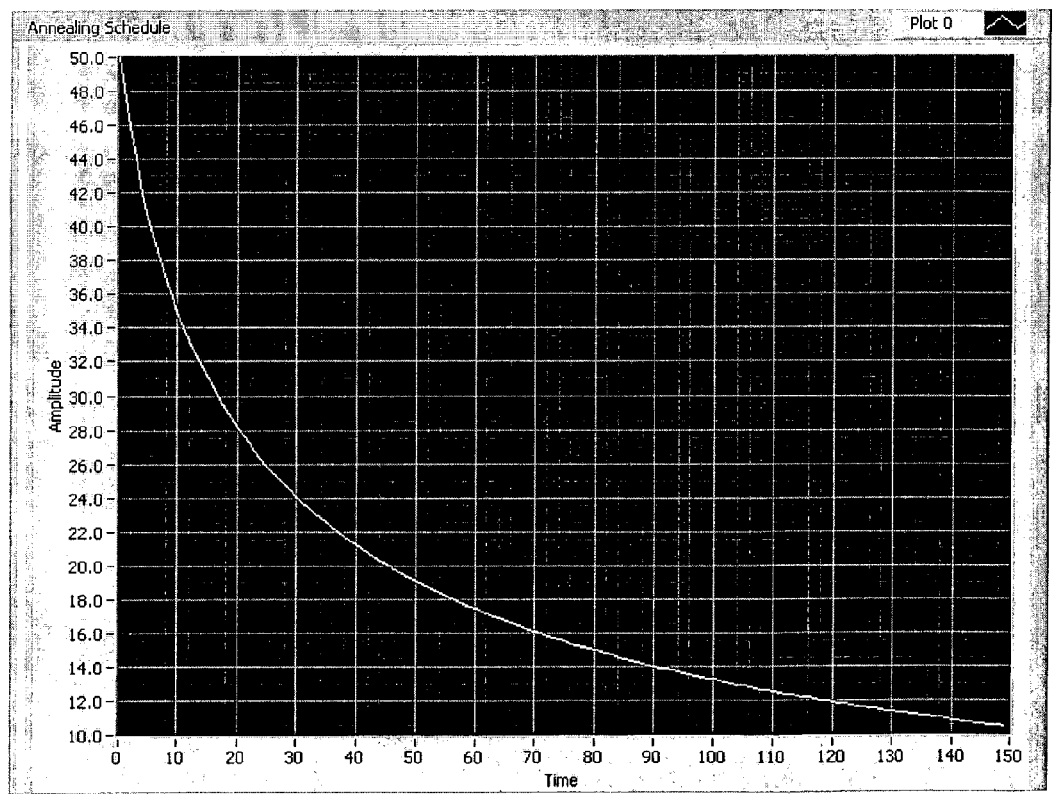
FIG. 8 illustrates a temperature schedule for a simulated annealing process, according to one embodiment.

FIGS. 7–8—Screen Shots Illustrating Aspects of the Autotuning System

Figure 2:
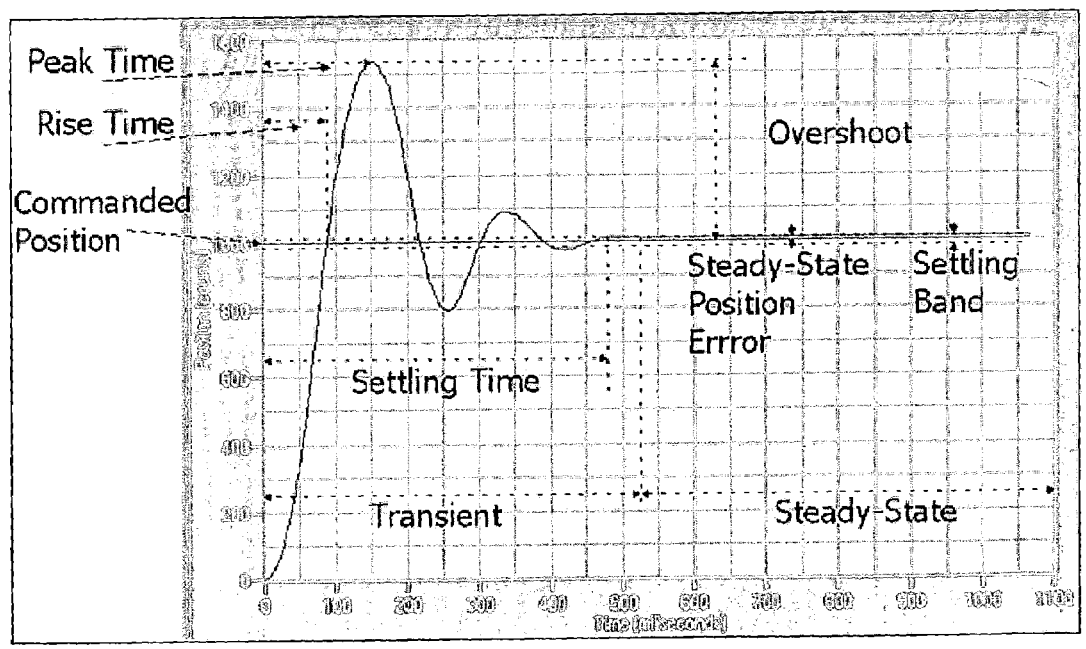
FIG. 2 illustrates some of the design parameters, e.g., for a second order system.

FIGS. 7 and 8 are screenshots illustrating various aspects of the methods described above, according to one embodiment. FIG. 7 illustrates a response of a motor to a step response for "good" gains values. The straight horizontal trace is the desired trajectory and the white trace is the response trajectory. Note the difference between this response trajectory and that of the "untuned" system illustrated in FIG. 1 (and the example response trace of FIG. 2). In this "properly tuned" system, the response trajectory has a small overshoot, and rapidly converges to the desired trajectory.

FIG. 8 illustrates a temperature schedule for a simulated annealing process, according to one embodiment. As FIG. 8 shows, the temperature rapidly descends from its initial value, then more gradually approaches the minimum value, e.g., zero, at which time the probability of making an "uphill" jump substantially vanishes. Generally, the probability of making an unfavorable jump is related to the temperature by an exponential expression, such as, for example, $$p(uphill) < e^{\frac{eval(v_c)-eval(v_n)}{T}}, \quad (11)$$

where T is the temperature, and the evaluations refer to the metric d (e.g., from equation (5)) for the current and new desired trajectories, as described above. The temperature is generally determined from a temperature schedule function (equation (9)), such that:

$$T \leftarrow g(T,t),$$

where t is time (or an iteration counter). In one embodiment, the temperature schedule function may be:

$$g(T, t) = Ce^{-\frac{t}{\tau}},$$

e.g., where C sets the scale, and $\tau$ shapes the curve, as also described above (equation (10)).

Figure 9:
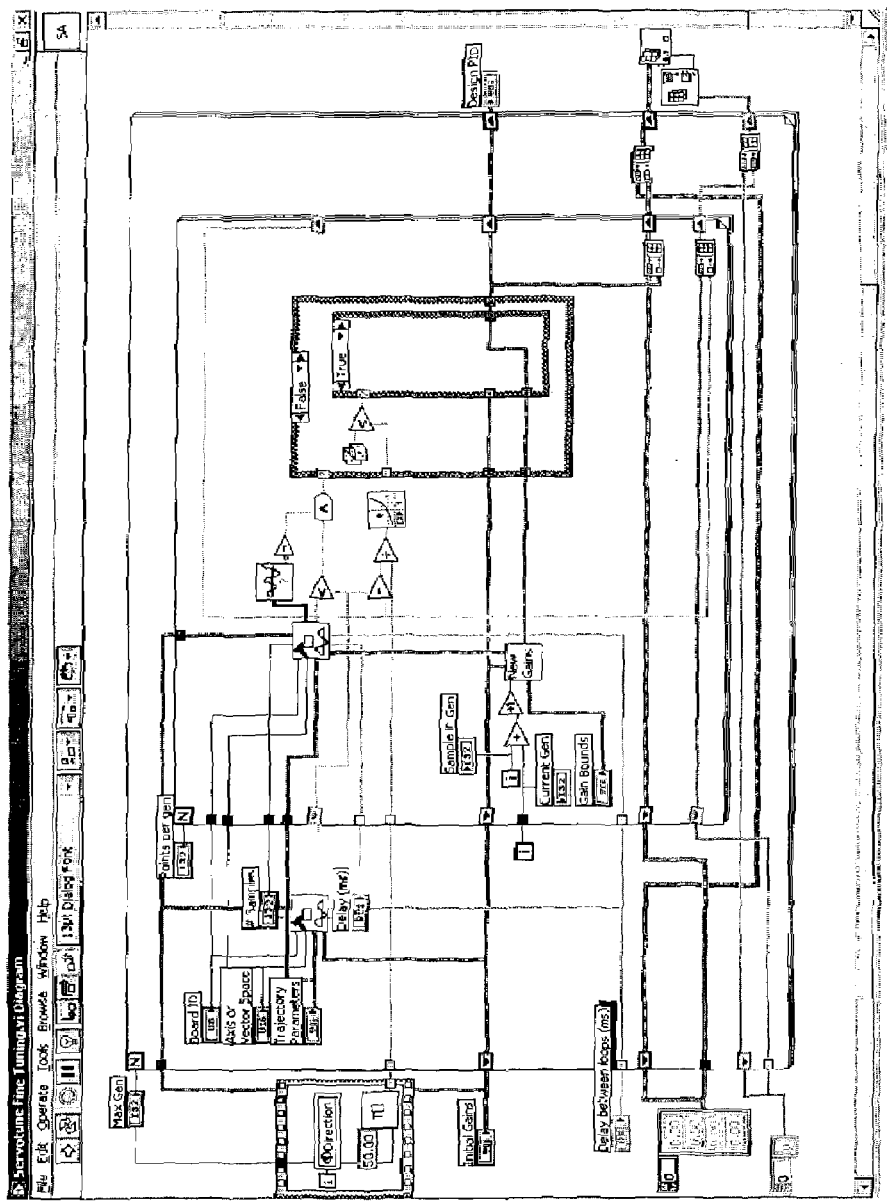
FIG. 9 illustrates a graphical program that implements one embodiment of the present invention using simulated annealing.

FIG. 9—Implementation of Simulated Annealing

FIG. 9 is an implementation of one embodiment of the present invention. More specifically FIG. 9 is a graphical program or block diagram implementing one embodiment of the simulated annealing approach of FIG. 6C. It should be noted that although the embodiment shown was developed in National Instruments Corporation's LabVIEW graphical development environment, the method may be implemented using any type of programming environment, system, language, or technique desired, this embodiment being but one example. Note that the key portion of this program is the "eval" VI (virtual instrument), represented by the icon with a hammer and sine wave. If this yields an improvement, the gains are accepted. If not, the gains are accepted with some probability, as described above.

Figure 10A:
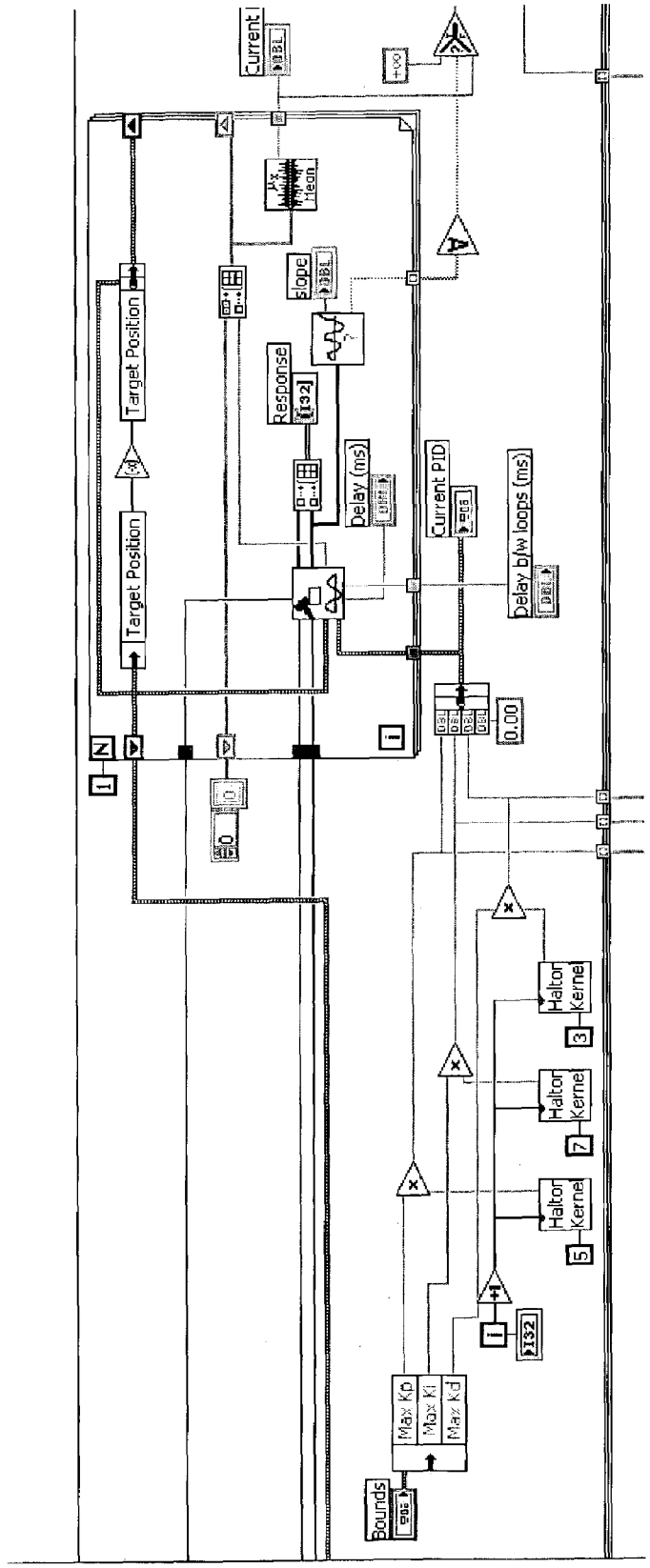
FIGS. 10A and 10B illustrate graphical programs implementing one embodiment of the experimental search using a Halton sequence.
Figure 10B:
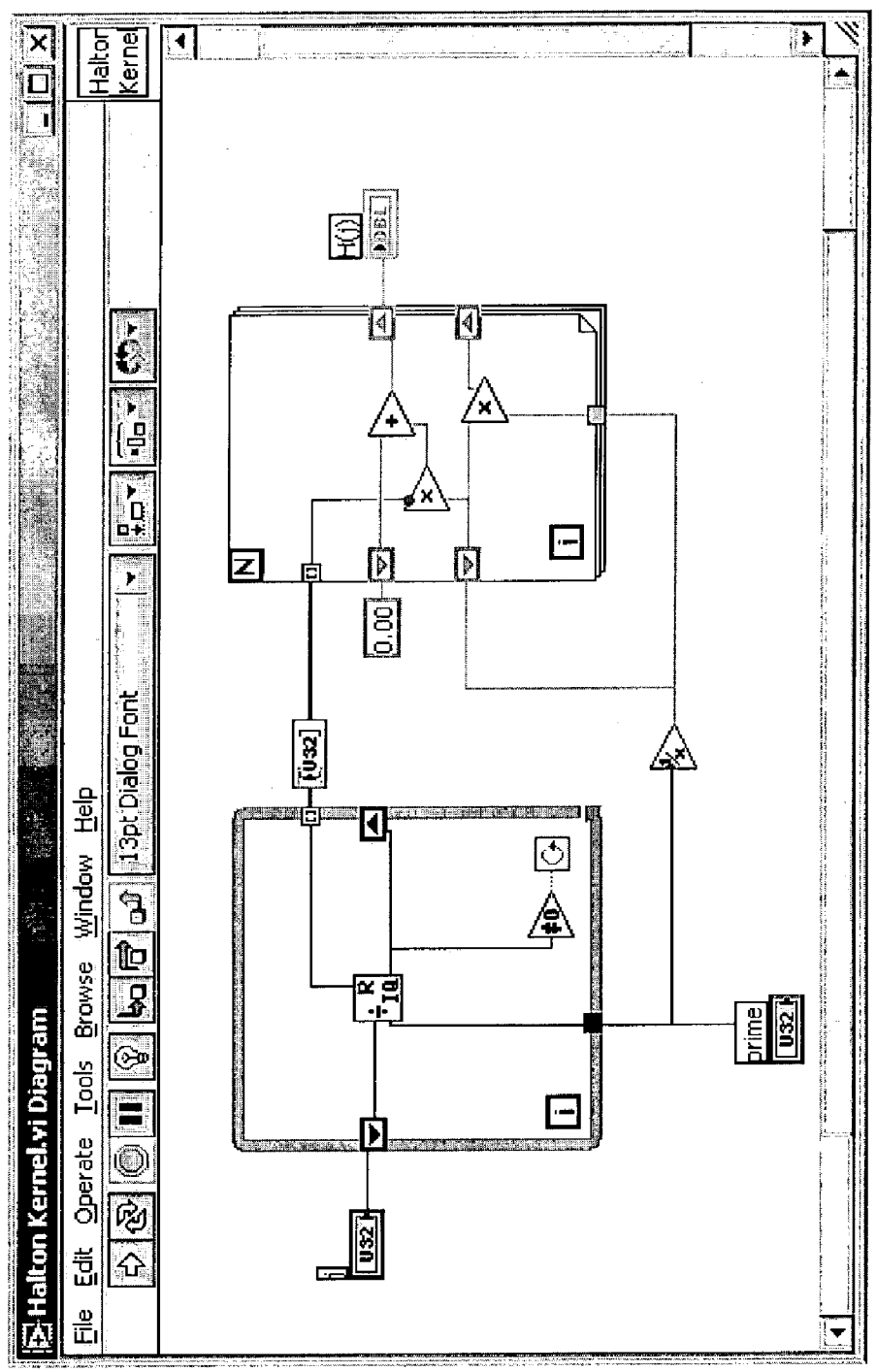

FIGS. 10A and 10B—Implementation Using a Halton Sequence

An alternate way to implement the search is to use a quasi-random distribution of points in parameter space. The Halton sequence (described below) is one promising candidate. It can be mathematically shown that this sequence samples space with the lowest discrepancy, i.e., for the given number of points, there is no better way to approximate the information contained by the continuous dense set of points.

As is well known to those skilled in the art, the Halton sequence can be used like a random number generator to produce points in the interval [0,1]. The Halton sequence is generally less random than a random number generator; if the index I of the Halton number desired is specified, there is a formula for producing H(I). On the other hand, the Halton sequence does a better job of filling in the region, avoiding the large gaps that can occur with a random number generator.

The idea is simple: a base is selected, e.g., 2. Then for each base 10 index value, I=1, 2, 3, . . . each value of I may be written in base 2, the digits reversed, including the decimal sign, and converted back to base 10:

1=1.0=>0.1=½
2=10.0=>0.01=¼
3=11.0=>0.11=¾
4=100.0=>0.001=⅛
5=101.0=>0.101=⅝
6=110.0=>0.011=⅜
7=111.0=>0.111=⅞ and so on. Thus, for any index, a corresponding Halton sequence value between 0 and 1 may be generated.

FIGS. 10A and 10B are graphical programs or block diagrams implementing one embodiment of the experimental search using a Halton sequence. More specifically, FIG. 10A illustrates relevant portions of a graphical program that implement the high-level experimental search, and FIG. 10B implements the generation of the Halton sequence for the method.

Figure 11:
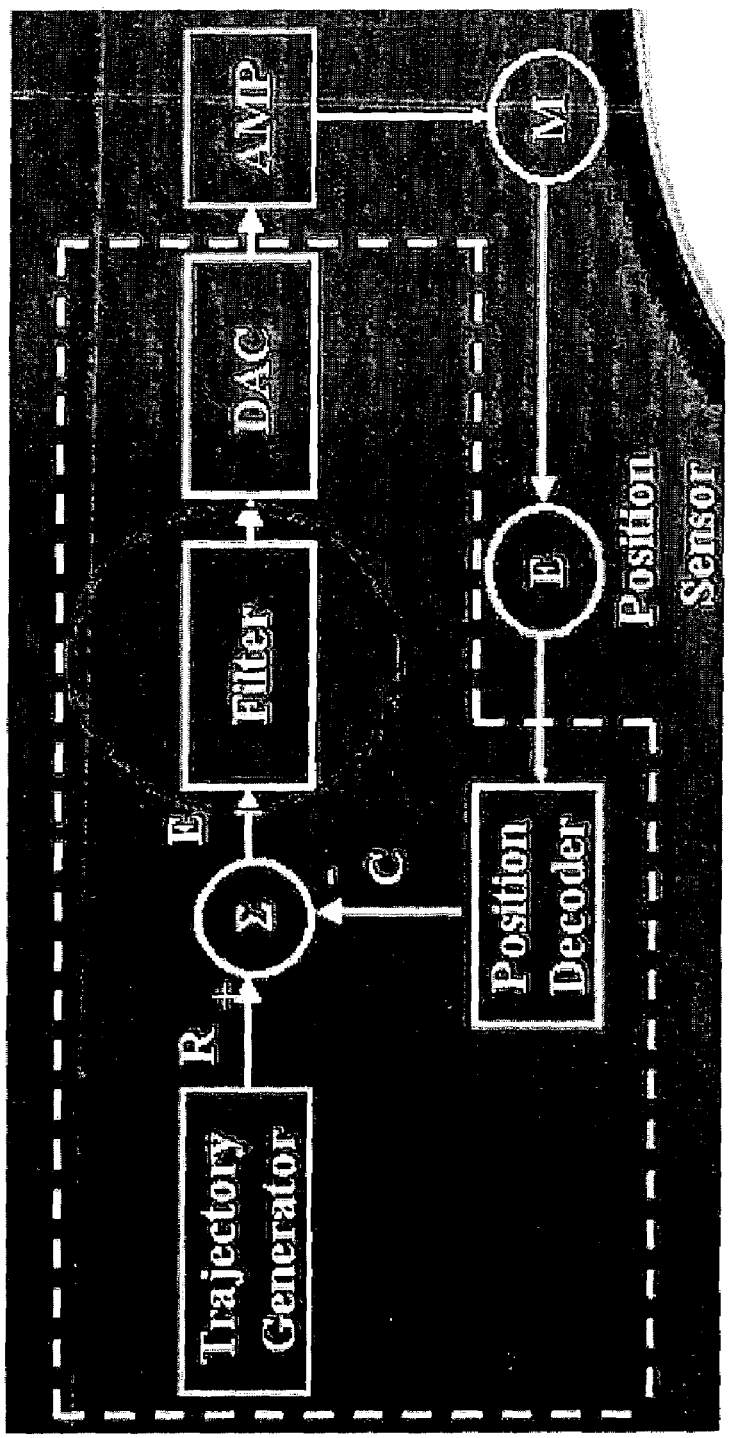
FIG. 11 is a block diagram illustrating a system implementation of the present invention, according to one embodiment.

FIG. 11—System Implementation

It should be noted that many practical motion control systems incorporate more than a simple control loop. The block diagram of FIG. 11 illustrates the nature of such motion control products, according to one embodiment. The control algorithm is represented by the block "Filter".

It may be seen that the motion control task is achieved by the combined effect of all these operations. For example, in this embodiment, a trajectory generator block provides a dynamically changing setpoint sequence to the control loop, which is rarely like a step response. Also, the loop shown is executed at a sampling rate that is much faster than the settling time of the physical system. In this context, it is not sufficient to tune the motors for step response based on settling time, rise time, etc., and thus, this is an area where the present invention is superior to traditional techniques.

Lastly, it is noted that the algorithm can be completely automated and may be implemented on desktop PCs interacting with motion control cards, on-board (on a DSP, FPGA, microcontrollers, etc.), i.e., within the motion control card itself, and in many other ways.

Advantages of the techniques presented herein include:

1. No model of the system is required.

2. The approach relies on experimenting with the physical system and hence captures physical quirks better than analytic model based approaches.

3. The same approach and methodology applies to a variety of different control architectures for implementing motion control.

3. A wide variety of user defined trajectories may be accommodated as input and a gain set found that is optimal precisely for the defined trajectory.

4. The approach can work with any type of motion system (i.e., DC servo motors, piezoelectric positioning systems, linear motors and magnetic positioning systems, and many others).

5. The approach can tune gains for best performance in a multi-dimensional application e.g., workcells and robots where the task is specified as a three dimensional trajectory. Moreover, there are applications where the response of every actuator and not just end effectors is important. In such cases, the proposed approach can scale naturally by taking all variables within the distance metric, a benefit not provided by prior art motion control systems.

Thus, in various embodiments of the system and method described above, a single or multiple axis based motion control system may be automatically tuned using experimental search techniques, e.g., simulated annealing. The search techniques may be based on a metric, e.g., a Euclidean norm, which quantifies the difference between a desired trajectory and a response trajectory of the system. This provides for great flexibility in applying motion control to a variety of different systems as compared to prior art auto-tuning systems and methods.

Although the system and method of the present invention has been described in connection with specific embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A carrier medium which stores program instructions for automatically tuning a motion control system, wherein the program instructions are executable by a processor to perform:

receiving a desired trajectory for the motion control system, wherein the desired trajectory is in one or more dimensions, wherein each dimension corresponds to an axis of the motion controller;

initializing values of one or more gains for a controller, wherein the one or more gains are comprised in a gain space;

receiving a response trajectory of the controller and motion control system in response to the desired trajectory;

determining an error between the response trajectory and the desired trajectory; and experimentally searching the gain space to determine final values of the one or more gains for the controller, wherein the final values minimize the error between the response trajectory and the desired trajectory;

wherein after said experimentally searching, the controller is operable to control the motion control system substantially in accordance with the desired trajectory using the determined final values of the one or more gains.

2. The carrier medium of claim 1, wherein said determining the error between the response trajectory and the desired trajectory comprises:

computing a norm of a difference between the response trajectory and the desired trajectory.

3. The carrier medium of claim 2, wherein the norm comprises a Euclidean norm.

4. The carrier medium of claim 3, wherein the Euclidean norm, $L_2$, comprises:

$$\|d\|_2 = \left(\sum_{i=0}^{N} (y(i) - x(i))^2\right)^{\frac{1}{2}},$$

wherein x comprises the desired trajectory, and wherein y comprises the response trajectory.

5. The carrier medium of claim 2, wherein the norm comprises a finite norm.

6. The carrier medium of claim 2, wherein the norm comprises an $L_1$ norm, comprising:

$$\|d\|_1 = \left(\sum_{i=0}^{N} (y(i) - x(i))\right),$$

wherein x comprises the desired trajectory, and wherein y comprises the response trajectory.

7. The carrier medium of claim 2, wherein the norm comprises an $L_p$ norm, comprising:

$$\|d\|_p = \left(\sum_{i=0}^{n} (y(n) - x(n))^p\right)^{\frac{1}{p}},$$

wherein x comprises the desired trajectory, and wherein y comprises the response trajectory.

8. The carrier medium of claim 7, wherein p is greater than 2.

9. The carrier medium of claim 7, wherein p is greater than 3.

10. The carrier medium of claim 7, wherein p is less than 1.

11. The carrier medium of claim 7, wherein p is infinite.

12. The carrier medium of claim 7, wherein p is equal to a maximum deviation between the desired trajectory and the response trajectory.

13. The carrier medium of claim 1, wherein the controller comprises a PID controller, and wherein the one or more gains comprise:
a proportional gain, an integral gain, and a derivative gain for each respective dimension of the one or more dimensions.

14. The carrier medium of claim 1, wherein the controller operates in accordance with the relation:

$$u(t)=f(e(t))$$

$$e(t)=y(t)-x(t)$$

wherein y(t) and x(t) represent observed and desired values, respectively, of a variable, and wherein the one or more gains comprise a corresponding one or more coefficients or parameters of $f(e(t))$.

15. The carrier medium of claim 14, wherein y(t), x(t), and $f(e(t))$ are multivariable functions, and wherein the one or more gains comprise coefficients or parameters for each respective dimension of the one or more dimensions.

16. The carrier medium of claim 1, wherein said initializing values of the one or more gains comprises:
selecting a point in the gain space.

17. The carrier medium of claim 16, wherein selecting a point in the gain space comprises:
selecting a random, pseudo-random, or quasi-random point in the gain space.

18. The carrier medium of claim 1, wherein said experimentally searching the gain space comprises:
experimentally searching the gain space using stochastic means.

19. The carrier medium of claim 18, wherein said experimentally searching the gain space using stochastic means comprises:
performing simulated annealing to search the gain space.

20. The carrier medium of claim 19, wherein said performing simulated annealing comprises:
a) evaluating a current response trajectory of the system and controller using current values of the one or more gains, thereby computing a current error of the current response trajectory with respect to the desired trajectory;
b) stochastically determining new values of the one or more gains, wherein the new values are in a specified neighborhood of the current values;
c) evaluating a new response trajectory of the system and controller using the new values of the one or more gains, thereby computing a new error of the new response trajectory with respect to the desired trajectory;
d) if the new error is less than the current error,
setting the current values of the one or more gains to the new values; and
setting the current error to the new error;
e) iteratively performing b) through d) until a stopping condition occurs;

wherein, after said iteratively performing, the controller is operable to control the motion control system.

21. The carrier medium of claim 20, wherein d) further comprises:
if the new error is not less than the current error,
stochastically determining whether to set the current values of the one or more gains to the new values based on a temperature schedule; and
if the determination is made to set the current values of the one or more gains to the new values based on a temperature schedule, setting the current values of the one or more gains to the new values.

22. The carrier medium of claim 21, wherein the program instructions are further executable to perform:
f) if the stopping condition occurs, updating the temperature in accordance with the temperature schedule; and
iteratively performing b) through f) until a halting condition occurs.

23. The carrier medium of claim 1, wherein said experimentally searching the gain space comprises:
experimentally searching the gain space using pseudo-random means.

24. The carrier medium of claim 1, wherein said experimentally searching the gain space comprises:
experimentally searching the gain space using quasi-random means.

25. The carrier medium of claim 24, wherein said experimentally searching the gain space using quasi-random means is performed using a Halton sequence.

26. The carrier medium of claim 1, wherein said experimentally searching the gain space comprises:
experimentally searching the gain space using deterministic means.

27. The carrier medium of claim 1, wherein said experimentally searching the gain space comprises:
experimentally searching the gain space using a hill-climbing technique.

28. The carrier medium of claim 1, wherein said one or more dimensions comprises two or more dimensions.

29. The carrier medium of claim 1, wherein said one or more dimensions comprises three or more dimensions.

30. The carrier medium of claim 1, wherein said one or more dimensions comprises four or more dimensions.

31. The carrier medium of claim 1, wherein the program instructions are further executable to perform:
operating the controller and motion control system substantially in accordance with the desired trajectory using the determined final values of the one or more gains.

32. The carrier medium of claim 31, wherein the program instructions are further executable to perform:
performing adaptive automatic tuning of the controller and motion control system by iteratively performing said experimentally searching the gain space to determine successive final values of the one or more gains for the controller during said operating the controller and motion control system.

33. The carrier medium of claim 1, wherein said experimentally searching the gain space to determine final values of the one or more gains for the controller comprises:
a) evaluating a current response trajectory of the system and controller using current values of the one or more gains, thereby computing a current error of the current response trajectory with respect to the desired trajectory;
b) determining new values of the one or more gains;

c) evaluating a new response trajectory of the system and controller using the new values of the one or more gains, thereby computing a new error of the new response trajectory with respect to the desired trajectory;

d) if the new error is less than the current error,
setting the current values of the one or more gains to the new values; and
setting the current error to the new error;

e) iteratively performing b) through d) until a stopping condition occurs;

wherein, after said iteratively performing, the controller is operable to control the motion control system.

34. A computer-based system for automatically tuning a motion control system, the computer system comprising:
a processor;
a memory medium coupled to the processor, wherein the memory medium stores program instructions executable by the processor to:
receive a desired trajectory for the motion control system, wherein the desired trajectory is in one or more dimensions;
initialize values of one or more gains for a controller, wherein the one or more gains are comprised in a gain space;
receive a response trajectory of the controller and motion control system in response to the desired trajectory;
determine an error between the response trajectory and the desired trajectory; and
experimentally search the gain space to determine final values of the one or more gains for the controller, wherein the final values minimize the error between the response trajectory and the desired trajectory;
wherein after said experimentally searching, the controller is operable to control the motion control system substantially in accordance with the desired trajectory using the determined final values of the one or more gains.

35. The computer system of claim 34, further comprising:
a display device coupled to the processor, wherein the display device is operable to display the desired trajectory and the response trajectory.

36. The computer system of claim 34, wherein the display device is further operable to display the error between the desired trajectory and the response trajectory.

37. A memory medium comprising program instructions for automatically tuning a motion control system, wherein the program instructions are computer-executable to perform:
receiving a desired trajectory for the motion control system, wherein the desired trajectory is in one or more dimensions;
initializing values of one or more gains for a controller, wherein the one or more gains are comprised in a gain space;
receiving a response trajectory of the controller and motion control system in response to the desired trajectory;
determining an error between the response trajectory and the desired trajectory; and
experimentally searching the gain space to determine final values of the one or more gains for the controller, wherein the final values minimize the error between the response trajectory and the desired trajectory;
wherein after said experimentally searching, the controller is operable to control the motion control system substantially in accordance with the desired trajectory using the determined final values of the one or more gains.

38. A computer-implemented method for automatically tuning a controller coupled to a motion control system, the method comprising:

a) initializing current values of one or more gains for the controller;

b) providing an input signal to the controller and system, wherein the input signal specifies a position trajectory/motion profile for the motion control system in one or more dimensions;

c) evaluating a current response of the system and controller to the input signal using the current values of the one or more gains, thereby computing a current value of a metric quantifying an error of the current response with respect to the input signal;

d) determining new values of the one or more gains, wherein the new values are in a specified neighborhood of the current values;

e) evaluating a new response of the system and controller to the input signal using the new values of the one or more gains, thereby generating a new value of the metric quantifying an error of the new response with respect to the input signal;

f) if the new value of the metric and the current value of the metric indicate that the error of the new response is less than the error of the current response,
setting the current values of the one or more gains to the new values; and
setting the current value of the metric to the new value of the metric; and g) iteratively performing d) through f) until a stopping condition occurs;

wherein, after said iteratively performing, the controller is operable to control the motion control system.

39. A system for automatically tuning a motion control system, the system comprising:
means for receiving a desired trajectory for the motion control system, wherein the desired trajectory is in one or more dimensions, wherein each dimension corresponds to an axis of the motion controller;
means for initializing values of one or more gains for a controller, wherein the one or more gains are comprised in a gain space;
means for receiving a response trajectory of the controller and motion control system in response to the desired trajectory;
means for determining an error between the response trajectory and the desired trajectory; and
means for experimentally searching the gain space to determine final values of the one or more gains for the controller, wherein the final values minimize the error between the response trajectory and the desired trajectory;
wherein after said experimentally searching, the controller is operable to control the motion control system substantially in accordance with the desired trajectory using the determined final values of the one or more gains.

* * * * *